US 8,467,291 B2

(12) United States Patent
Lövsén et al.

(10) Patent No.: US 8,467,291 B2
(45) Date of Patent: Jun. 18, 2013

(54) POLICY CONTROL WITH PREDEFINED RULES

(75) Inventors: Lars Lövsén, Göteborg (SE); John Stenfelt, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 12/997,106

(22) PCT Filed: May 27, 2009

(86) PCT No.: PCT/EP2009/056406
§ 371 (c)(1),
(2), (4) Date: Dec. 9, 2010

(87) PCT Pub. No.: WO2009/150042
PCT Pub. Date: Dec. 17, 2009

(65) Prior Publication Data
US 2011/0106933 A1 May 5, 2011

Related U.S. Application Data

(60) Provisional application No. 61/060,281, filed on Jun. 10, 2008.

(51) Int. Cl.
*H04L 12/14* (2006.01)
(52) U.S. Cl.
USPC ........................................... 370/230; 709/224
(58) Field of Classification Search
USPC ... 370/230, 235, 252; 455/405, 406; 709/223, 709/226–229
See application file for complete search history.

(56) References Cited

U.S. PATENT DOCUMENTS

2009/0141740 A1* 6/2009 Baruah et al. ................. 370/469
2009/0161676 A1* 6/2009 Breau et al. .................... 370/392

FOREIGN PATENT DOCUMENTS

WO  WO 2006087414 A1 *  8/2006

OTHER PUBLICATIONS

Rothenberg et al., A Review of Policy-Based Resource and Admission Control Functions in Evolving Access and Next Generation Networks, Mar. 6, 2008, Journal of Network and Systems Management—Springer, (2008) 16:14-45.*

(Continued)

*Primary Examiner* — Farid Homayounmehr
*Assistant Examiner* — Zhimei Zhu
(74) *Attorney, Agent, or Firm* — Nixon & Vanderhye P.C.

(57) ABSTRACT

The present invention relates to a method for policy control in an infrastructure network. The network comprises a Policy Enforcement Function, PEF, an Access Function, AF, and a Policy Control Function, PCF, wherein the PEF comprises at least one pre-defined Policy and Charge Control, PCC, rule. The method comprises the steps of: —the PCF determines 23 the Quality of Service, QoS, properties and the identity of at least one pre-defined PCC rule in the PEF and provides said identity to the PEF, —the PCF assigns 24 the same identity to a QoS dynamic rule having the same QoS properties as said PCC rule and provides said dynamic rule to the AF, —the PEF determines 25 the identity of a pre-defined rule matching a user plane packet and encodes at least the identity in a user plane protocol between the PEF and the AF, —the AF identifies 26 the QoS dynamic rule provided by the PCF on the basis of the identity encoded in the user plane by the PEF, and controls the service data flow towards a user equipment on the basis of said QoS rule.

16 Claims, 4 Drawing Sheets

OTHER PUBLICATIONS

Notification of Transmittal of International Preliminary Report for International Application No. PCT/EP2009/056406 mailed Dec. 17, 2010.

3GPP TS 23.203 V8.1.1, Policy and Charging Control Architecture, XP-002544560, Mar. 25, 2008, pp. 1-87.

Draft 3GPP TS 23.402, Architecture Enhancements for non-3GPP Accesses, XP050033766, Apr. 28, 2008, pp. 1-152.

International Search Report for PCT/EP2009/056406, mailed Sep. 17, 2009.

Written Opinion of the International Searching Authority for PCT/EP2009/056406, mailed Sep. 17, 2009.

ZTE: "QoS Rule", 3GPP Draft; C3-080616, $3^{RD}$ Generation Partnership Project (3GPP), vol. CT WG3, No. Cape Town, ZA, (Apr. 28, 2008), pp. 8-85.

"3GPP TS 23.203 Policy and Charging Control Architecture", [Online], (Mar. 25, 2008), p. 1-p. 3.

"$3^{rd}$ Generation Partnership Project; Technical Specification Group Core Network and Terminals; CT WG3 Aspect of 3GPP System Architecture Evolution: (Stage 3); Release 8", vol. CT WG3, No. Cape Town, ZA, (May 20, 2008), pp. 7-8, 12-18, 34 and 35.

3GPP: "$3^{rd}$ Generation Partnership Project; Technical Specification Group Services and System Aspects; Architecture Enhancements for Non-3GPP Accesses (Release 8)", vol. SA WG2, No. 20080000, (Jan. 25, 2008), pp. 9, 10, 14, 15, 24-27, 31-33, 35-38, 54, 58, 59, 138-143.

* cited by examiner

POLICY CONTROL WITH PREDEFINED RULES

This application is the U.S. national phase of International Application No. PCT/EP2009/056406, filed 27 May 2009, which designated the U.S. and claims the benefit of U.S. Provisional Appln. No. 61/060,281, filed 10 Jun. 2008, the entire contents of each of which are hereby incorporated by reference.

TECHNICAL FIELD

The technology described in this application relates to a method for policy control in an infrastructure network. It also relates to a Policy Enforcement Function, PEF, an Access Function, AF, a Policy Control Function, PCF and an infrastructure network adapted for the same purpose.

BACKGROUND

3GPP has defined the Policy and Charging Control (PCC) feature to allow the QoS (Quality of Service) control and differentiated charging per service data flow. The latter is defined as the user plane packets in the access that match a certain PCC rule.

A separate node, the Policy and Charging Rule Function (PCRF) is responsible for activating the appropriate PCC rule for each access. The PCRF can provide a dynamic PCC rule to the GGSN/PDN-GW (Gateway GPRS Support Node/Packet Data Network Gateway) over the Gx reference point in the 3GPP architecture. The GGSN/PDN-GW may host pre-defined rules, which may include more advanced detection capabilities than what is possible with dynamic rules. Still the PCRF can, by referencing the rule by name, activate and deactivate the rule for a certain user.

The 3GPP Rel-8 architecture is illustrated in FIG. 1. The architecture will not be described in detail here. Further information regarding the architecture can be received by studying this 3GPP project.

The service data flow detection at the GGSN/PDN-GW is local in that node. The result of the service data flow detection is not communicated in the user plane outside the GGSN/PDN-GW. With the 3GPP Re.-8 architecture, there are deployment options (variations of Mobile IP—MIP) where a single (MIP) tunnel conveys the traffic between the PDN-GW and (e.g.) the Serving GW (S-GW).

The 3GPP Rel-8 non-roaming architecture for PMIP-based (Proxy MIP) access is shown in FIG. 2. The architecture will not be described in detail here. Further information regarding the architecture can be received by studying this 3GPP project.

Reference point Gx in FIG. 2 is the same as Gx in FIG. 1, the Gxc reference point corresponds to Gxx, which has got the name settled to be Gxx. In FIG. 2, the PCEF (Policy and Charging Enforcement Function) is located in the PDN-GW and the BBERF (Bearer Binding and Event Reporting Function) in the S-GW.

From the S-GW towards the UE, (see FIG. 2) there are bearers, with differentiated QoS, to which the S-GW is expected to map the service data flow according to the PCRF policy decision. For that purpose the PCRF provides, for dynamic rules, the rule that is necessary (a.k.a. QoS rules) to do the service data flow detection and the proper mapping to downlink bearers at the S-GW.

Since the predefined rules, when using capabilities beyond dynamic rules, cannot be provided to the S-GW from the PCRF, it is not possible to conduct PCC control over such traffic at an S-GW (in the MIP deployment scenarios) with a solution based solely on 3GPP Rel-8 standard. This also implies that any kind of application level policies per bearer in the S-GW (BBERF), e.g. application level access control or policing, would be impossible.

In order to achieve this, extensions would be required to the standard functionality. One possible solution to the problem is to duplicate both the predefined rules as well as the actual detection (may be arbitrarily complex) at both the PDN-GW and the S-GW. But this is disadvantageous for several reasons:

- Performing classification of pre-defined services by the use of so called deep-packet inspection (DPI) in the S-GW will severely impact the performance of the S-GW. This implies an increased need for processing power and this will eventually lead to increased CAPEX (Capital Expenditures) for the operator.
- DPI is performed redundantly for each packet (once at the PCEF and then once more in the S-GW) introducing highly unwanted latency into the user plane.
- Pre-defined rules in S-GW must be aligned with the ones in the PCEF. Apart from the obvious O&M implications this will have on an operators own network (i.e. increased OPEX—Operational Expenditures), this will practically preclude the use of home routed access for the roaming case.

To summarize, the current 3GPP EPC (Evolved Packet Core) architecture (formerly known as SAE—System Architecture Evolution) does not provide the adequate means to perform downlink bearer binding based on pre-defined rules when the bearer binding function is located in the S-GW (BBERF). Currently only dynamically provisioned QoS rules provided by the PCRF can be used for this. A non-standardized solution that duplicates the packet inspection mechanism in the S-GW is expensive and quality degrading.

SUMMARY

An object is therefore to provide an improved way to perform downlink bearer binding based on predefined rules when the bearer binding function is located in the S-GW.

A method is provided for policy control in an infrastructure network that comprises a Policy Enforcement Function, PEF, an Access Function, AF, and a Policy Control Function, PCF, wherein the PEF comprises at least one pre-defined Policy and Charge Control, PCC, rule. The method comprises the steps of:

- the PCF determines the Quality of Service, QoS, properties and the identity of at least one pre-defined PCC rule in the PEF and provides said identity to the PEF,
- the PCF assigns the same identity to a QoS dynamic rule having the same QoS properties as said PCC rule and provides said dynamic rule to the AF,
- the PEF determines the identity of a pre-defined rule matching a user plane packet and encodes at least the identity in a user plane protocol between the PEF and the AF,
- the AF identifies the QoS dynamic rule provided by the PCF on the basis of the identity encoded in the user plane by the PEF, and controls the service data flow towards a user equipment on the basis of said QoS rule.

The Policy Enforcement Function, PEF, is configured for policy control in an infrastructure network comprising the PEF, an Access Function, AF, and a Policy Control Function, PCF. The PEF comprises at least one pre-defined Policy and Charge Control, PCC, rule. The PEF determines the identity of a pre-defined rule matching a user plane packet and encodes at least the identity in a user plane protocol between the PEF and the AF.

The Access Function, AF, is configured for policy control in the infrastructure network. The AF identifies the QoS dynamic rule provided by the PCF on the basis of an identity conveyed in the user plane by the PEF, and controls the service data flow towards a user equipment on the basis of said QoS rule.

The Policy Control Function, PCF, is configured for policy control in the infrastructure network. The PCF determines the Quality of Service, QoS, properties and the identity of at least on pre-defined PCC rule in the PEF. The PCF assigns the same identity to QoS dynamic rule having the same QoS properties as the PCC rule and to provide the dynamic rule to the AF.

The technology described in this application enables the same QoS control functionality for downlink traffic at the BBERF for service data flows detected with a predefined PCC rule at the PCEF as is available in the 3GPP TS 23.203 Rel-8 for dynamically provided rules. The invention also has the following technical advantages:
- Deep packet inspection is only required to be performed once.
- Pre-defined rules can easily be used also for Home routed roaming scenarios.
- The technology is based on an exchange of information between different network elements that are extensions to the 3GPP standard.

DETAILED DESCRIPTION

The embodiments with further developments described in the following are to be regarded only as examples and are in no way to limit the scope of the protection provided by the patent claims.

A method Policy Control is provided in an infrastructure network that includes a Policy Enforcement Function, PEF, an Access Function, AF, a Policy Control Function, PCF and. Even though the detailed description describes methods and functions performed by entities/network, the person skilled in the art realizes that such entities/network configured to perform these method steps and functions are also disclosed in the description.

Figure 3:
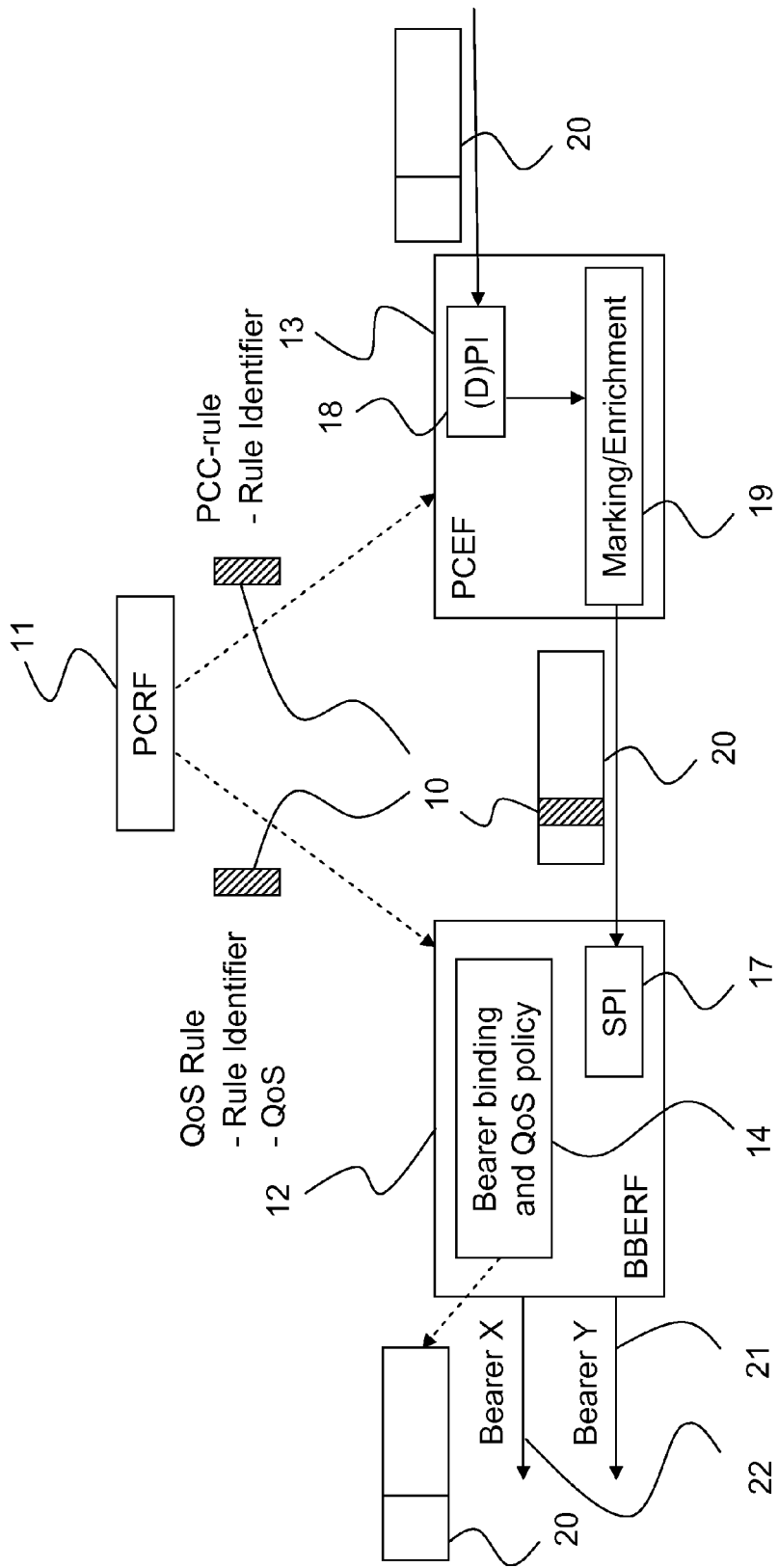
FIG. 3 illustrates an example policy control.

The PEF 13 is for instance a Policy and Charging Enforcement Function (PCEF), see FIG. 3. It could be part of the Packet Data Network Gateway (PDN-GW) or any other gateway node in the user plane. In the following, the PEF will be exemplified by a PCEF. Further tasks for the PCEF will be described below.

The PCEF may comprise a Deep Packet Inspection (DPI) 18, see FIG. 3, which could perform at least some of the tasks mentioned in the following. The DPI generally has the role of examining the data part (and possibly also the header) of a packet 20 as it passes an inspection point. It may for instance search for protocol non-compliance or predefined criteria to decide if the packet can pass or if it needs to be routed to a different destination, or for the purpose of collecting statistical information.

The AF 12 is for instance a Bearer Binding and Event Reporting Function (BBERF), see FIG. 3. It could be part of the Serving Gateway (S-GW) or any other support node in the user plane. In the following, the AF will be exemplified by a BBERF. Further tasks for the BBERF will be described in the following.

The AF may comprise a Simple Packet Inspection (SPI) 17, see FIG. 3, which could perform at least some of the tasks mentioned in the following. The SPI generally has the role examining the header only of a packet 20 as it passes an inspection point.

Figure 1:
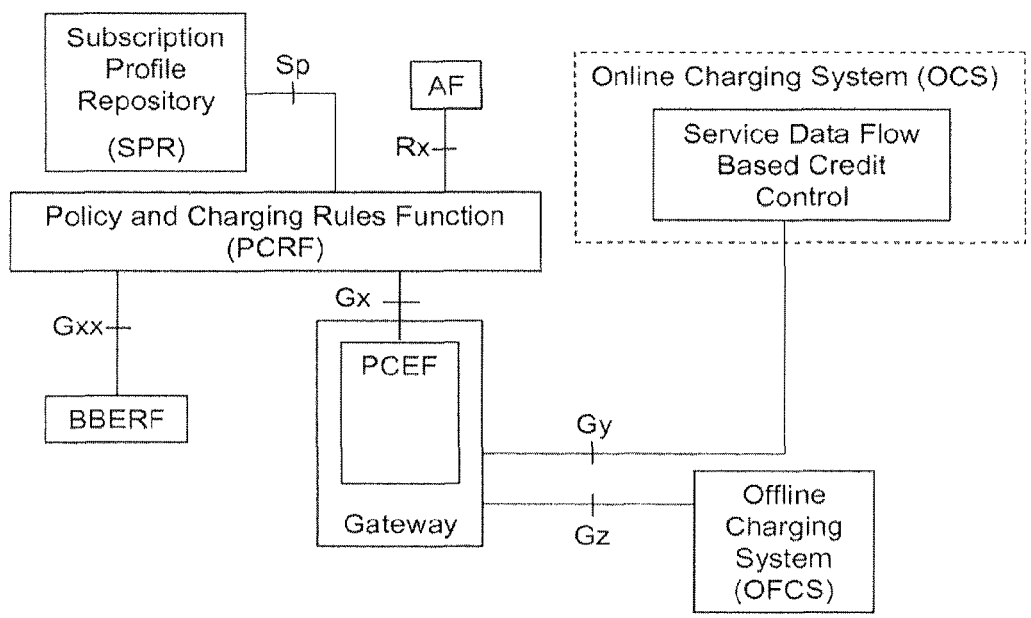
FIG. 1 illustrates the 3GPP Rel-8 PCC architecture.
Figure 2:
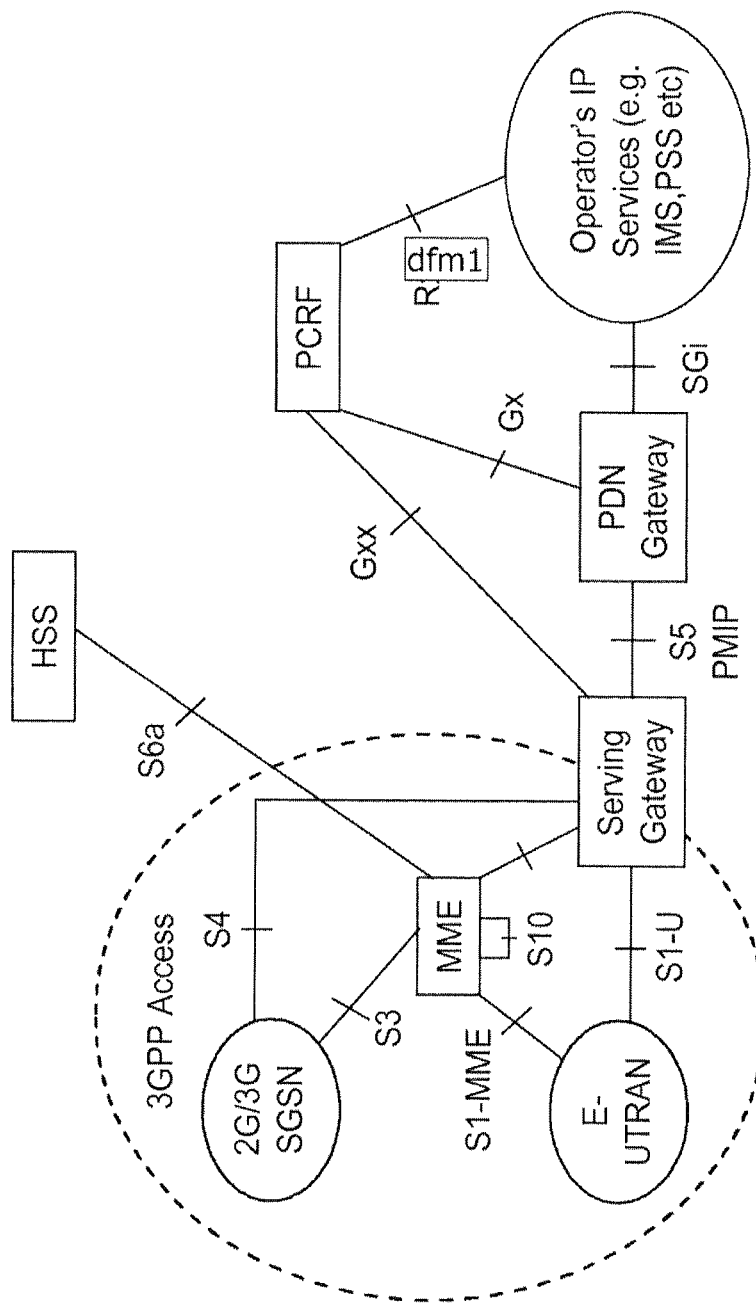
FIG. 2 illustrates the 3GPP Rel-8 non-roaming architecture.

The PCF 11 is for instance a Policy and Charging Rule Function (PCRF), see FIG. 3. In the following, the PCF will be exemplified by a PCRF. Further tasks for the PCRF will be described in the following. The PCRF may communicate with PCEF via Gx reference point and with BBERF via Gxx, see FIG. 2.

The PCEF 13 comprises at least one pre-defined Policy and Charge Control, PCC, rule (in the following named PCC rule). The PCRF 11 in a first step 23, see FIG. 4, determines the Quality of Service, QoS, properties and the identity 10 of at least one pre-defined PCC rule in the PCEF and provides said identity to the PCEF. The identity will in the following be named rule identifier 10.

Pre-defined rules are as stated in 3GPP Rel-8 preconfigured in PCEF 13. The rules can be activated or deactivated by the PCRF. The rule to be activated or deactivated is identified by providing the rule identifier to the PCEF together an action indicator. The rule amongst other information comprises QoS parameters with authorized rate for uplink and downlink. This determined QoS information will be used in the next step.

Figure 4:
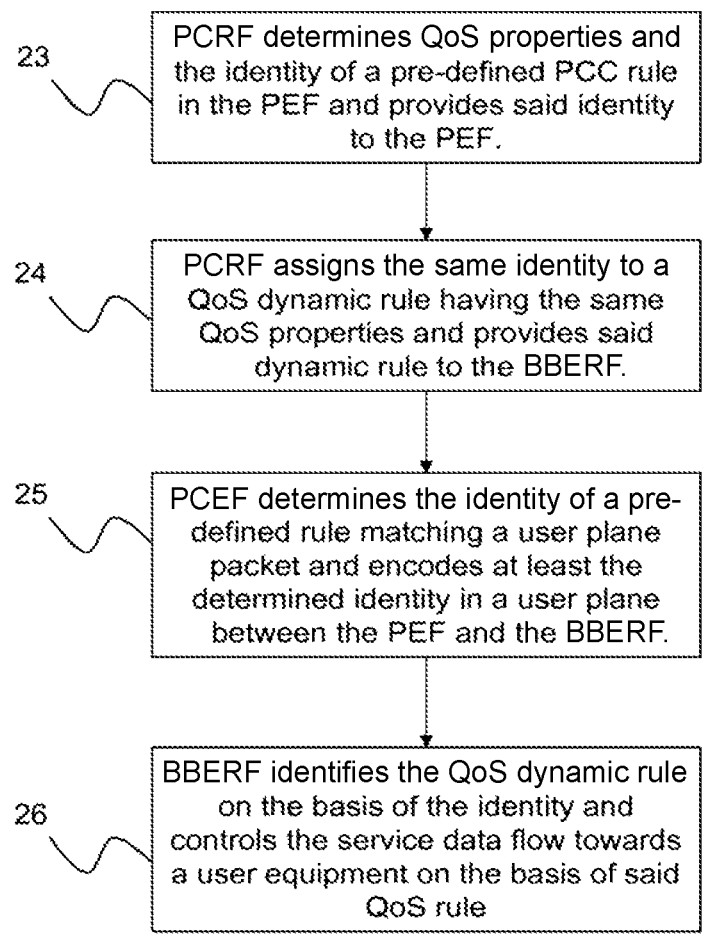
FIG. 4 illustrates a flow chart for an example method.

In this next step 24, see FIG. 4, the PCRF 11 assigns the same rule identifier 10 also to a QoS dynamic rule (in the following named QoS rule). This rule has the same QoS properties as said PCC rule. The PCRF provides said QoS rule to the BBERF 12. See FIG. 3.

With these two steps 23/24, the PCRF 11 identifies PCC/QoS rules (for instance over Gx to the PCEF 13 and Gxx to the BBERF 12) using a rule identifier 10. The PCRF uses the same rule identifier for paired PCC/QoS rules, so that the PCEF and BBERF (e.g. the S-GW) have the same rule identifier for the rules that (are expected to) detect the same traffic. The PCC rules and the QoS rules are communicated as a pair and have the same rule identifier 10 (on the Gx and the Gxx).

The following steps are then performed:
- In a third step 25, the PCEF determines the rule identifier 10 of a PCC rule matching a user plane packet and encodes at least the rule identifier 10 in a user plane protocol between the PCEF and the BBERF 12.
- In a final step 26, the BBERF identifies the QoS dynamic rule provided by the PCRF 11 on the basis of the rule identifier encoded in the user plane by the PCEF, and controls the service data flow towards a user equipment on the basis of said QoS rule.

The third 25 step may for instance be performed with support from the DPI 18, which has been mentioned earlier, see FIG. 3. The markup in the third step may be performed by a Marking/Enrichment function 19. The identification in final step 26 may be performed with support from SPI 17, which has been mentioned earlier, see FIG. 3. The service data flow control may be performed by a Bearer binding and QoS policy 14.

The advantage with these steps is that the user plane between the PCEF 13 and the BBERF 12 is augmented with the capability to convey the rule identifier of the PCC rule that matched the user plane payload packet 20. The BBERF is further augmented with the ability to do service data flow detection based on PCEF user plane markup with the rule identifier 10.

Since the service data flow template, which defines how the service data flow is detected, is locally configured at the PCEF 13, the PCRF 11 cannot provide the service data flow template to the BBERF 12. Instead the PCRF 11 provides a QoS rule, with the same rule identifier as the corresponding PCC rule. The QoS rule indicates that the PCC rule is predefined at the PCEF, but includes all other QoS rule parameters in the normal way.

The coordination of the PCC and QoS rule identities is the responsibility of PCRF 11. The QoS rule includes a service data flow template that indicates that the rule is predefined at the PCEF 13 and encoded within the user plane protocol between the PCEF 13 and BBERF 12.

The QoS rule may comprise further information to assist the BBERF 12. The PCRF 11 may then provide such PCEF rule information to the BBERF together with the dynamic rule. Said information will inform the BBERF that the PCEF 13, for user plane packets 20 that matches said provided rule, provides the rule identifier 10 together with the payload.

The BBERF 12 may, if required by the user plane protocol, initiate control signalling with the PCEF 13 to acquire the PCEF encoding scheme for the rule identifier 10. As an alternative, the encoding scheme may be pre-provisioned in the nodes through configuration.

The BBERF treats the QoS parameters of a QoS rule in the normal way and may create bearer binding for the downlink traffic with a bearer 21, 22 with the same QoS characteristics as defined in the identified QoS (dynamic) rule. FIG. 3 shows two bearers X 22 and Y 21 on which the packet 20 may be sent.

This treatment by BBERF 12 implies that any TFT (Traffic Flow Template) filter that is present for the downlink traffic is ignored. The BBERF maintains the bearer binding with the downlink bearer 21, 22 for downlink traffic in the normal way, based on the QCI (QoS Class Identifier) only. The BBERF may validate the bearer binding against the negotiated TFT filters for each packet.

Alternatively, the BBERF 12 may send the packet 20 according to the bearer binding, without validating against the TFT filters. This is possible for accesses where compliance with the negotiated TFT filters is not required. The UE (not shown) should be prepared receiving traffic that does not strictly obey the negotiated TFT filters.

The PCEF 13 encoding of the rule identifier 10 (third step 25) may be specified per protocol used between the PCEF 13 and the BBERF 12. Any extensible protocol can accommodate the information. For non-extensible protocols, the protocol must be able to transport the information without any change to the protocol.

The PCEF 13 may encode the rule identifier 10 in an IPv6 options header of an encapsulating transport protocol. The new options type may be defined in the header to enable said encoding.

The IPv6 protocol inherently supports the Next Header capability as well as the definition of new types of headers (RFC 2460, 2402 and 2404). RFC is the Request For Comments which is a formalized memoranda addressing Internet standards. The Rule identifier 10 is conveyed from the PCEF 13 to the BBERF 12:

using the IPv6 Destination Options header (RFC 2460, chapter 4.2).

defining a new Option Type, e.g. called Service Data Flow Identity. The Option Type has an encoding that is defined in RFC 2460:

```
+-+-+-+-+-+-+-+-+-+-+-+-+-+-+-+-+- - - - - - - -
| Option Type | Opt Data Len | Option Data
+-+-+-+-+-+-+-+-+-+-+-+-+-+-+-+-+- - - - - - -
```

| Option Type | 8-bit identifier of the type of option. |
|---|---|
| Opt Data Len | 8-bit unsigned integer. Length of the Option Data field of this option, in octets. |
| Option Data | Variable-length field. Option-Type-specific data. |

Option Type 8-bit identifier of the type of option.

Opt Data Len 8-bit unsigned integer. Length of the Option Data field of this option, in octets.

Option Data Variable-length field. Option-Type-specific data.

The allocation of Option Type values is handled by IANA (Internet Assigned Numbers Authority). The first 3 bits of the Option Type specifies variations as to how a receiver shall treat the option. The $1^{st}$ two bits specify what the receiver shall do if the Option Type is not recognized. For the Service Data Flow Identity, the value 00 (skip this option and process the next header) should be used. The value 11 is also a candidate, which mandates the receiver to report back to the sender that the Option Type is not understood. This may be used to stop providing the Service Data Flow Identity from the PCEF.

The $3^{rd}$ bit indicates whether the option may change on-route between the sender and the receiver. This bit should be 0 (option does not change on-route). There may be deployments, e.g. in a roaming scenario, where the suitable settings for the $1^{st}$ 3 bits in the Option Type differs from what is described here. Such deviations, e.g. changing the option on-route, call for additional functionality, coordinating the sender and receiver so that the desired effect is achieved.

In particular, if the $1^{st}$ two bits of the Option Type are always 11, then the specific header type for the Service Data Flow Identity is possible. This approach may yield better performance.

The IPv6 protocol also has the possibility of Flow Labelling with the IPv6 header field Flow Label (20 bits). Using the Flow Label does not add to the header length, but the Rule identifier must probably be replaced with another identity (due to the 20 bit limit) that the PCRF shall include in the PCC and QoS rules respectively.

The use of the Flow Labelling capability would be expected to yield the best performance, but requires two (different kinds of) rule identities 10 and the Flow Label may be needed for some other purpose. Also the Flow Label is visible to the intermediate nodes. This may be regarded both as a risk and a benefit—the assessment may change over time.

The PCEF may instead encode the rule identifier in an IPv4 header of an encapsulating transport protocol. The IPv4 transport does not have the same possibilities of providing extra information together with a packet. A work-around for IPv4 transport may be the use of DSCP (Differentiated Service Code Point). Using DSCP does however not provide the granularity possible with IPv6. Other deficiencies with DSCP are that the value range is not sufficient for distinguishing individual rules from each other and that the intermediate nodes act upon the DSCP value to provide the corresponding hop-by-hop value.

3GPP has agree to use GRE tunneling, RFC 2784 and 2890, for the PMIP transport between the PDN-GW and S-GW. The RFC 2890 is applied for differentiating each pair of UE and PDN access from other pairs. The mechanism can be extended, by reserving a bit in the Reserved0 field for the purpose of the rule identifier 10 present and add the corresponding data field to the GRE header.

It will be appreciated by a person skilled in the art that the embodiments described above and are not limiting and that, a number of additional variants and modifications are possible and within the scope of the subsequent patent claims.

For instance, once the method is available for predefined rules, the PCEF may provide the rule identifier in every packet 20 sent to the BBERF. Moreover, service data flow detection at the BBERF may be altered to solely use the rule identifier 10 for the service data flow detection there. Having a single, simplified method for service data flow detection at the BBERF provided for performance optimization of the node.

The invention claimed is:

1. A method for policy control in an infrastructure network, comprising the steps of:
   determining Quality of Service (QoS) properties and an identity of at least one pre-defined Policy and Charge Control (PCC) rule;
   assigning a same identity to a QoS dynamic rule having the same QoS properties as said at least one PCC rule;
   determining an identity of a pre-defined rule matching a user plane packet and encoding at least the identity in a user plane protocol between a Policy Enforcement Function (PEF) and an Access Function (AF); and
   identifying the QoS dynamic rule on the basis of the identity encoded in the user plane, and controlling a service data flow towards a user equipment on the basis of said QoS dynamic rule.

2. A method according to claim 1, comprising the step of:
   providing PEF rule information to the AF together with the QoS dynamic rule, said PEF rule information informing the AF that the PEF provides the identity together with the payload for user plane packets that match said provided rule.

3. A method according to claim 1, comprising the step of:
   initiating control signaling to acquire an encoding scheme for the encoded identity.

4. A method according to claim 1, comprising the step of:
   pre-provisioning an encoding scheme for the encoded identity through configuration.

5. A method according to claim 1, comprising the step of:
   creating bearer binding for downlink traffic with a bearer with same QoS characteristics as defined in the identified QoS dynamic rule.

6. A method according to claim 1, wherein the encoding of the identity is specified per protocol used between the PEF and the AF.

7. A method according to claim 6, wherein the identity is encoded in an IPv6 options header of an encapsulating transport protocol.

8. A method according to claim 7, wherein a new option type is defined in the header to enable said encoding.

9. A method according to claim 6, wherein the identity is encoded in an IPv4 header of an encapsulating transport protocol.

10. An infrastructure network, comprising:
    a Policy and Charging Rule Function (PCRF) node configured to determine Quality of Service (QoS) properties and an identity of at least one pre-defined Policy and Charge Control (PCC) rule in a Policy and Charging Enforcement Function (PCEF) node;
    the PCRF node further configured to assign a same identity to a QoS dynamic rule having the same QoS properties as said at least one PCC rule, the PCRF node further configured to transmit said dynamic rule to an Access Function (AF) node;
    the PCEF node configured to determine the identity of the pre-defined rule matching a user plane packet and encode at least the identity in a user plane protocol between the PCEF node and the AF node;
    the AF node configured to identify the QoS dynamic rule provided by the PCRF on the basis of the identity conveyed in the user plane by the PCEF, and to control the service data flow towards a user equipment on the basis of said QoS dynamic rule.

11. The network of claim 10, wherein the PCRF node is further configured to provide PCEF rule information to the AF node together with the QoS dynamic rule, said PCEF rule information informing the AF node that the PCEF node provides the identity together with the payload for user plane packets that match said provided rule.

12. The network of claim 10, wherein the AF node is further configured to initiate control signaling to acquire an encoding scheme for the encoded identity.

13. The network of claim 10, wherein the AF node is further configured to create bearer binding for downlink traffic with a bearer with same QoS characteristics as defined in the identified QoS dynamic rule.

14. The network of claim 10, wherein the encoding of the identity is specified per protocol used between the PCEF node and the AF node.

15. The network of claim 14, wherein the identity is encoded in an IPv6 options header of an encapsulating transport protocol.

16. The network of claim 14, wherein the identity is encoded in an IPv4 header of an encapsulating transport protocol.

* * * * *